(12) United States Patent
Zhang et al.

(10) Patent No.: US 11,340,957 B2
(45) Date of Patent: May 24, 2022

(54) METHOD FOR MANAGING COMPUTING DEVICES, ELECTRONIC DEVICE AND COMPUTER STORAGE MEDIUM

(71) Applicant: EMC IP Holding Company LLC, Hopkinton, MA (US)

(72) Inventors: Min Zhang, Shanghai (CN); Yechen Huang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/935,965

(22) Filed: Jul. 22, 2020

(65) Prior Publication Data

US 2021/0216376 A1 Jul. 15, 2021

(30) Foreign Application Priority Data

Jan. 14, 2020 (CN) .......................... 202010038061.2

(51) Int. Cl.
*G06F 9/50* (2006.01)
*G06F 13/40* (2006.01)
*G06F 13/42* (2006.01)
*G06F 13/16* (2006.01)

(52) U.S. Cl.
CPC ........ *G06F 9/5083* (2013.01); *G06F 13/1668* (2013.01); *G06F 13/4022* (2013.01); *G06F 13/4282* (2013.01); *G06F 2209/5022* (2013.01); *G06F 2213/0026* (2013.01)

(58) Field of Classification Search
None
See application file for complete search history.

(56) References Cited

U.S. PATENT DOCUMENTS

| 8,031,722 | B1 | 10/2011 | Sanville et al. |
| 8,327,187 | B1 * | 12/2012 | Metcalf ................. G06F 12/123 714/10 |
| 10,409,504 | B2 | 9/2019 | Hu et al. |
| 10,409,524 | B1 * | 9/2019 | Branover ............. G06F 3/0634 |

(Continued)

OTHER PUBLICATIONS

Zhang, Min, et al.; "Method for Detecting Data Storage System, Device and Data Storage System," U.S. Appl. No. 16/936,709, filed Jul. 23, 2020.

*Primary Examiner* — Henry Tsai
*Assistant Examiner* — Christopher A Bartels
(74) *Attorney, Agent, or Firm* — BainwoodHuang

(57) ABSTRACT

Techniques for managing computing devices involve: determining an associated weight of each storage device based on a mapping relationship between each storage device in storage devices and partitions included in a switch, the partitions being respectively associated with the computing devices, the storage devices being respectively connected to downstream physical ports of the switch; determining a total associated weight of a storage pool based on the associated weight of each storage device, the storage pool being created based on the storage devices; and if it is determined that the total associated weight does not satisfy a predetermined balance condition, adjusting the mapping relationship between the partitions and the downstream physical ports. Accordingly, such techniques can dynamically adjust the mapping between the partitions of the switch and downstream physical ports, thereby balancing the workloads on the computing devices and buses.

19 Claims, 11 Drawing Sheets

(56) References Cited

U.S. PATENT DOCUMENTS

| | | | |
|---|---|---|---|
| 2012/0154375 A1* | 6/2012 | Zhang | G06F 9/4411 345/419 |
| 2013/0054901 A1* | 2/2013 | Biswas | G06F 13/1642 711/154 |
| 2013/0246650 A1* | 9/2013 | Tsuboki | H04L 49/10 709/236 |
| 2014/0173017 A1* | 6/2014 | Takagi | G06F 3/0685 709/213 |
| 2014/0344488 A1* | 11/2014 | Flynn | G06F 13/00 710/52 |
| 2015/0091927 A1* | 4/2015 | Cote | G06T 1/20 345/547 |
| 2019/0205153 A1* | 7/2019 | Niestemski | G06F 9/45558 |
| 2020/0241985 A1 | 7/2020 | Zhang et al. | |
| 2020/0349040 A1 | 11/2020 | Zhang | |
| 2021/0042255 A1* | 2/2021 | Colenbrander | A63F 13/90 |
| 2021/0064234 A1* | 3/2021 | Zhang | G06F 9/5016 |
| 2021/0117249 A1* | 4/2021 | Doshi | H04L 67/1014 |

* cited by examiner

METHOD FOR MANAGING COMPUTING DEVICES, ELECTRONIC DEVICE AND COMPUTER STORAGE MEDIUM

CROSS-REFERENCE TO RELATED APPLICATION

This application claims priority to Chinese Patent Application No. CN202010038061.2, on file at the China National Intellectual Property Administration (CNIPA), having a filing date of Jan. 14, 2020, and having "METHOD FOR MANAGING COMPUTER DEVICES, ELECTRONIC DEVICE AND COMPUTER STORAGE MEDIUM" as a title, the contents and teachings of which are herein incorporated by reference in their entirety.

FIELD

Embodiments of the present disclosure generally relate to the field of information processing, and specifically to a method, electronic device and computer storage medium for managing computing devices.

BACKGROUND

A current platform with a plurality of computing devices only supports a static mapping from the computing devices to storage devices. In the case of such a static mapping, the mapping relationship between the computing devices and storage devices is fixed, and an operation associated with a storage device can be performed on the fixed computing device to which the storage device is mapped.

Hence, in a conventional solution for managing computing devices based on the static mapping, after a storage pool is created based on a plurality of storage devices, such a static mapping might cause unbalanced workload between a plurality of buses and the plurality of computing devices and finally affects the overall performance.

SUMMARY

Embodiments of the present disclosure provide a method, electronic device and computer storage medium for managing computing devices, which can implement dynamic balancing of workloads on a plurality of computing devices and buses and improve the overall performance.

According to a first aspect of the present disclosure, there is provided a method for managing computing devices. The method includes: determining an associated weight of each storage device based on a mapping relationship between each storage device in a plurality of storage devices and a plurality of partitions included in a switch, the plurality of partitions being respectively associated with a plurality of computing devices, the plurality of storage devices being respectively connected to a plurality of downstream physical ports of the switch; determining a total associated weight of a storage pool based on the associated weight of each storage device in the plurality of storage devices, the storage pool being created based on the plurality of storage devices; and if it is determined that the total associated weight does not satisfy a predetermined balance condition, adjusting the mapping relationship between the plurality of partitions and the downstream physical ports.

According to a second aspect of the present disclosure, there is provided an electronic device. The electronic device includes at least one processing unit and at least one memory. The at least one memory is coupled to the at least one processing unit and has instructions stored thereon and executed by the at least one processing unit. The instructions, when executed by the at least one processing unit, causes the device to perform acts, the acts including: determining an associated weight of each storage device based on a mapping relationship between each storage device in a plurality of storage devices and a plurality of partitions included in a switch, the plurality of partitions being respectively associated with a plurality of computing devices, the plurality of storage devices being respectively connected to a plurality of downstream physical ports of the switch; determining a total associated weight of a storage pool based on the associated weight of each storage device in the plurality of storage devices, the storage pool being created based on the plurality of storage devices; and if it is determined that the total associated weight does not satisfy a predetermined balance condition, adjusting the mapping relationship between the plurality of partitions and the downstream physical ports.

According to a third aspect of the present disclosure, there is provided a computer-readable storage medium having a computer program stored thereon, wherein the computer program, when executed by a machine, causes the machine to implement any step of the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of the present disclosure will be made more apparent by describing example embodiments of the present disclosure in more detail with reference to figures. In the example embodiments of the present disclosure, the same reference signs usually represent the same element.

In all figures, the same or corresponding reference numbers denote the same or corresponding parts.

DETAILED DESCRIPTION OF EMBODIMENTS

Figure 1:
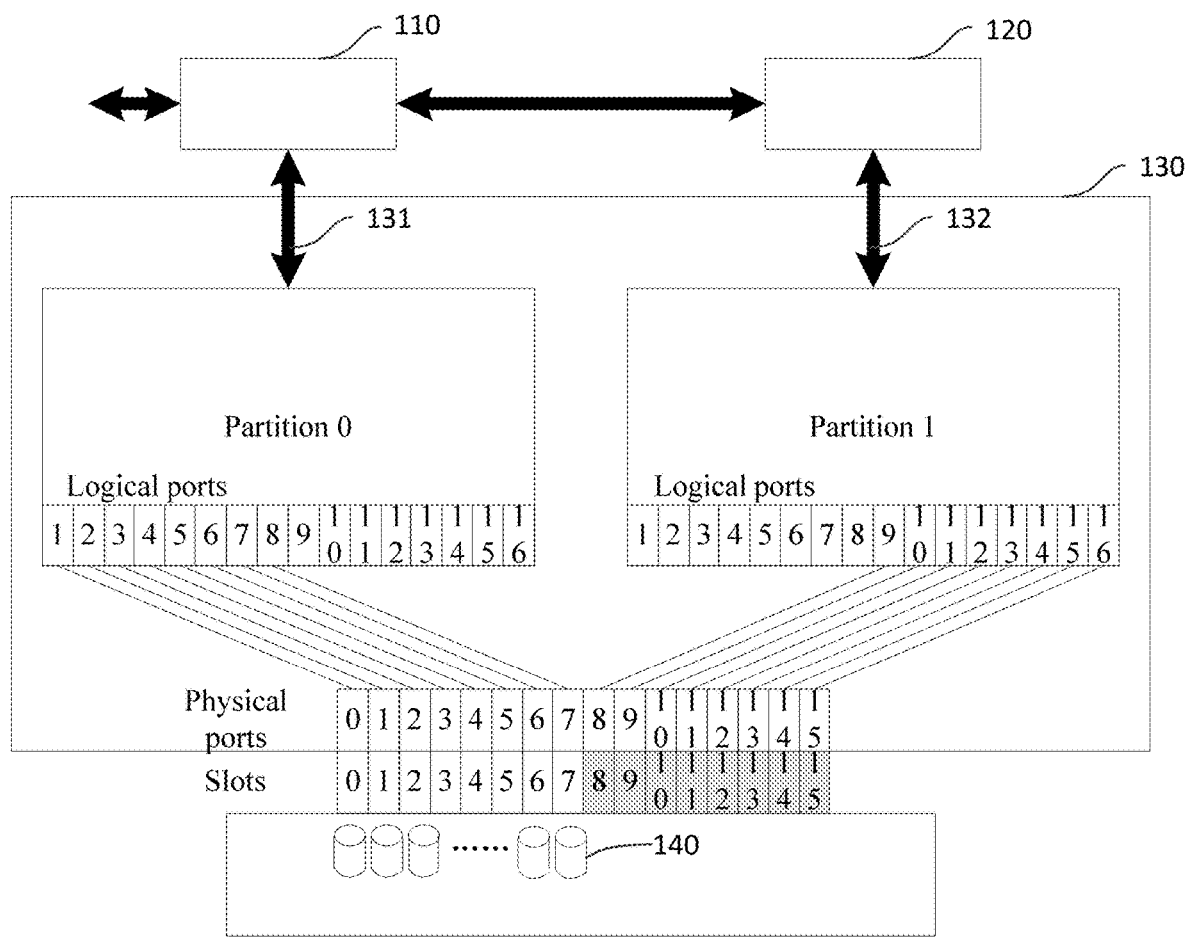
FIG. 1 illustrates a schematic diagram of an example of arranging storage devices from front to back according to the prior art.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to enable the present disclosure to be understood more thoroughly and completely, and convey the scope of the present disclosure completely to those skilled in the art.

In the depictions of the embodiments of the present disclosure, the term "includes" and its variants are to be read as open-ended terms that mean "includes, but is not limited to." Unless otherwise specified, the term "or" represents "and/or". The term "based on" is to be read as "based at least in part on." The term "one example implementation" and "an example implementation" are to be read as "at least one example implementation." The term "another implementation" is to be read as "at least one further implementation". Terms such as "a first" and "a second" may denote different or identical objects. The following text may also include other explicit or implicit definitions.

It is discovered from research that the conventional solution for managing computing devices based on such a static mapping cannot provide a dynamic mechanism for rebalancing the workload of computing devices upon operation, and replies on the user's manual operation to ensure the storage devices are mapped to correct computing devices. The conventional solution for managing computing devices is described hereunder with reference to FIG. 1 through FIG. 6.

FIG. 1 illustrates a schematic diagram of an example of arranging storage devices from front to back according to the prior art. As shown in FIG. 1, a switch 130 is connected to the computing devices 110-120 via two upstream ports and two buses 131-132, respectively. The switch 130 may include two partitions. Partition 0 is associated with computing device 110, and partition 1 is associated with computing device 120. The partitions are used to manage the corresponding downstream physical ports. The computing devices 110-120 are for example two processors.

The storage device 140 is connected to the downstream physical port of the switch 130. For example, the storage device 140 may be inserted into a slot, and the slot is connected to the downstream physical port of the switch 130.

As shown in FIG. 1, there may be 16 slots, respectively mapped or connected to 16 physical ports from the switch 130. The physical ports include 8 physical ports 0-7 mapped to logical ports 1-8 of partition 0 and 8 physical ports 8-15 mapped to logical ports 9-16 of the partition 1.

As shown in FIG. 1, if the user only inserts 8 storage devices 140 in the first 8 slots and creates a storage pool based on these storage devices 140, the data load will be on a path from the computing device 110 to the partition 0 via the bus 131.

Figure 2:
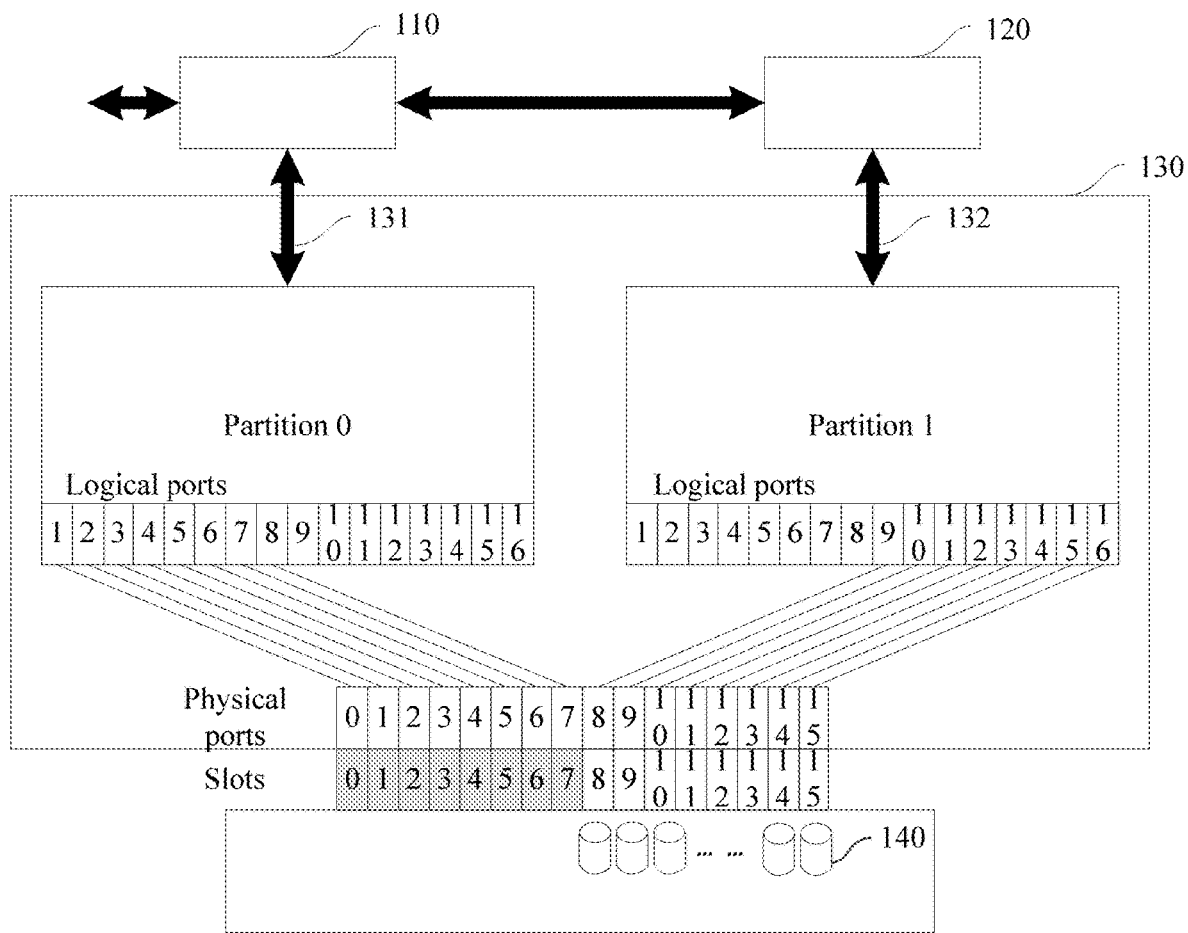
FIG. 2 illustrates a schematic diagram of an example of arranging storage devices from back to front according to the prior art.

In contrast, FIG. 2 illustrates a schematic diagram of an example of arranging storage devices from back to front according to the prior art. As shown in FIG. 2, if all the storage devices 140 are located in the last 8 slots, the data load will be on a path from the computing device 120 to the partition 1 via the bus 132.

Figure 3:
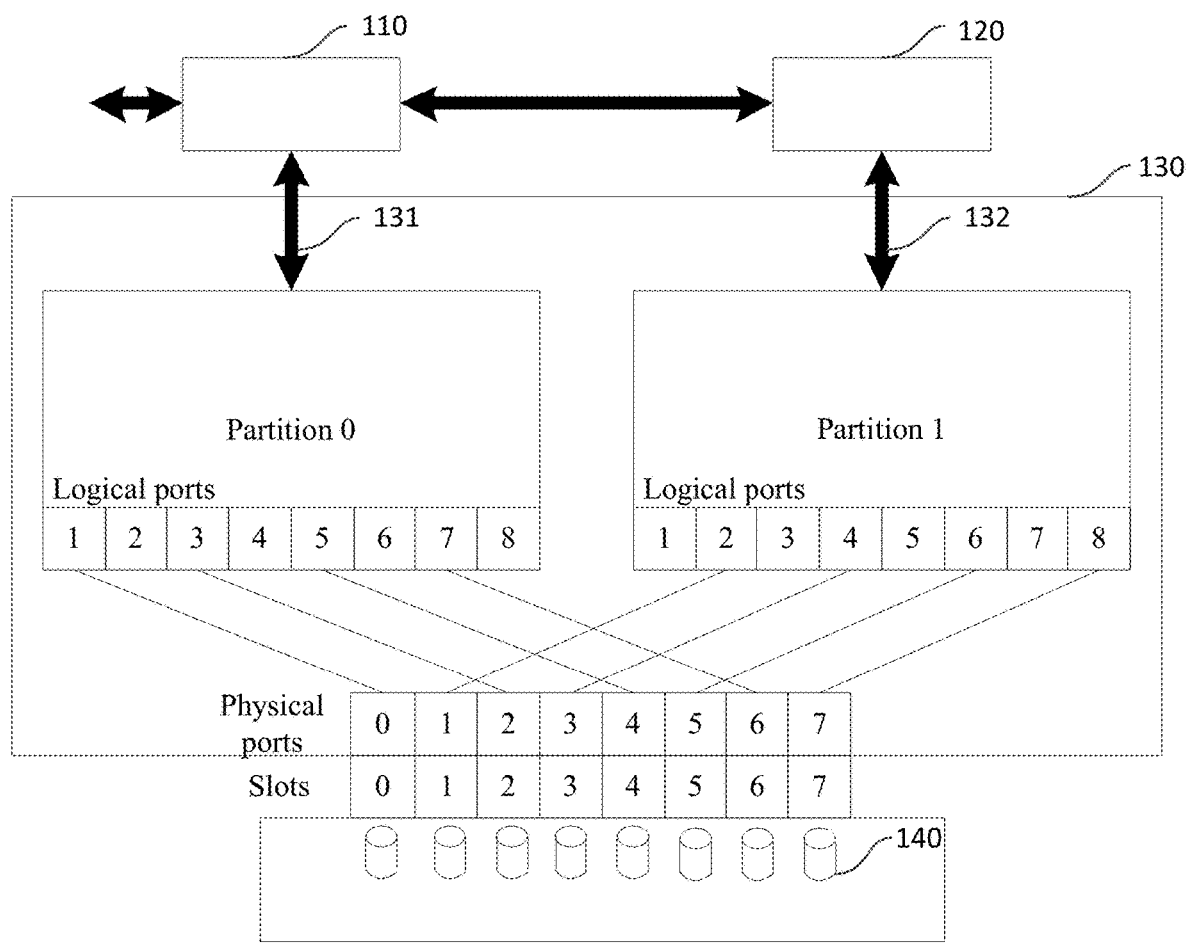
FIG. 3 illustrates a schematic diagram of an example of cross mapping for physical ports and logical ports according to the prior art.

If it is considered that the user is taught by for example a user manual, the storage devices 140 are sequentially inserted starting from the first slot to avoid the above-mentioned problems. The cross mapping may be employed. FIG. 3 illustrates a schematic diagram of an example of cross mapping for physical ports and logical ports according to the prior art. To simplify the description, only 8 slots are illustrated in the figure.

Figure 4:
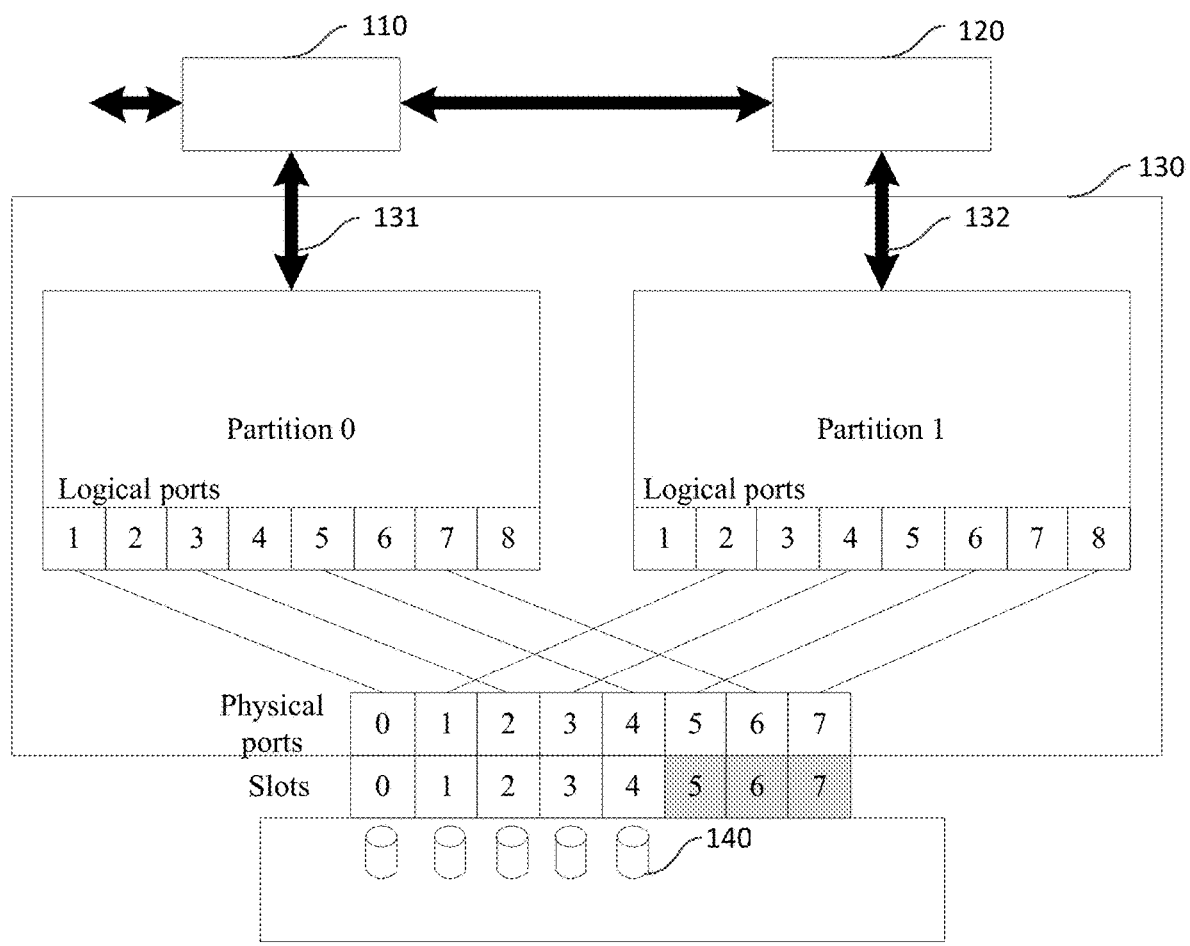
FIG. 4 is a schematic diagram showing an example of arranging storage devices from front to back according to the prior art.

In the switch 130, a mapping can be configured between the physical port and the logical port to cross from the two partitions 0 and 1. For example, in the case where the storage devices 140 are inserted sequentially as shown in FIG. 4, it is possible to balance the bandwidths for the two buses 131-132 and balance the loads for the two computing devices 110-120.

However, there are still other situations that disrupt the balance of the loads of the computing devices and the bandwidths of buses.

Figure 5:
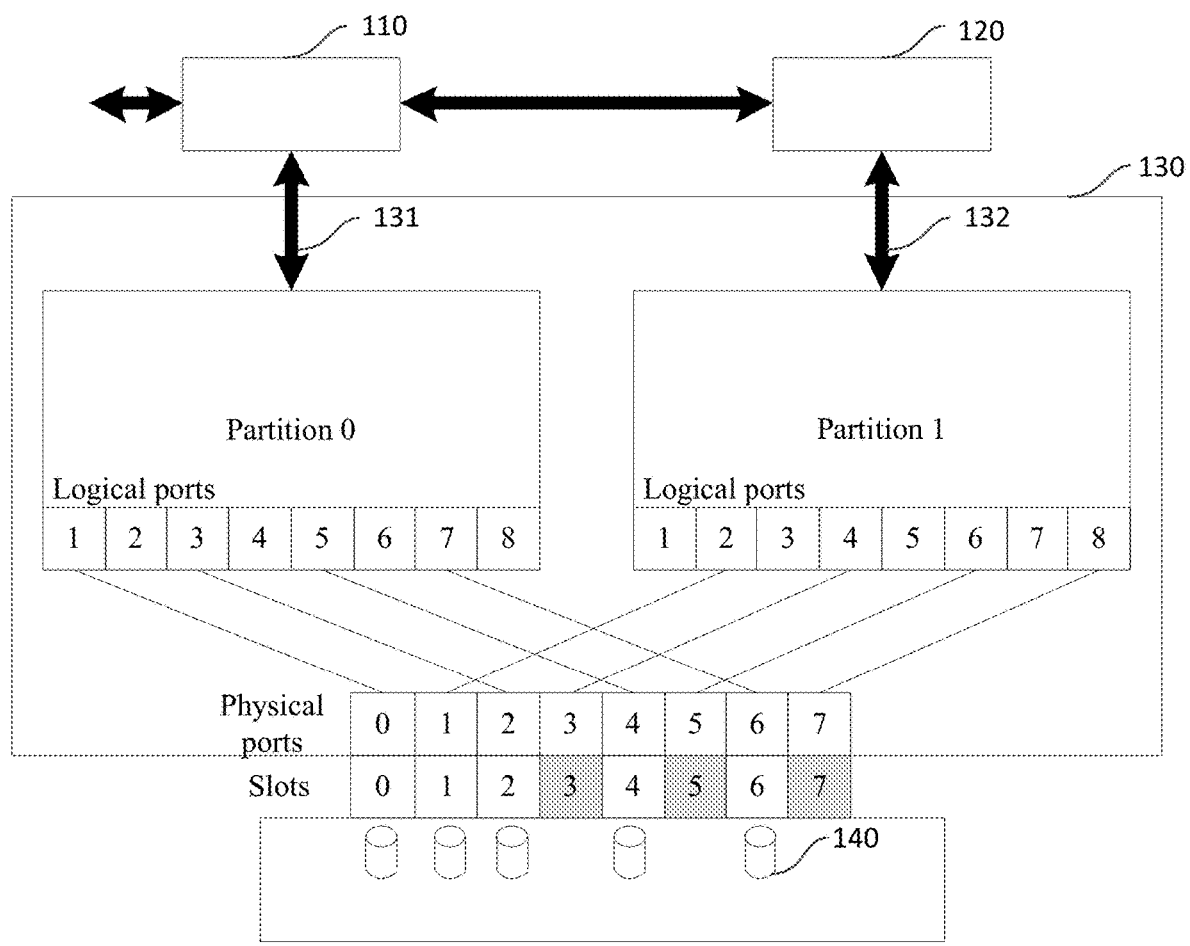
FIG. 5 illustrates a schematic diagram of an example of randomly arranging storage devices according to the prior art.

Case 1: even though the user is provided with the teaching to insert the storage devices 140 sequentially starting from the first slot, the user does not insert the storage devices 140 sequentially as instructed by the user manual, but randomly inserts the storage device 140, as shown in FIG. 5. The worst case is that if the user creates a storage pool based on the storage devices 140 corresponding to slots 0, 1, 2, 4, and 6, then obviously the storage devices 140 corresponding to slots 0, 1, 2, 4, and 6 are mapped to partitions 0, and data is transmitted with the computing device 110 through the bus 131. Hence, most of the data load will be on the computing device 110, and the computing device 120 and the bus 132 will be relatively idle.

Figure 6:
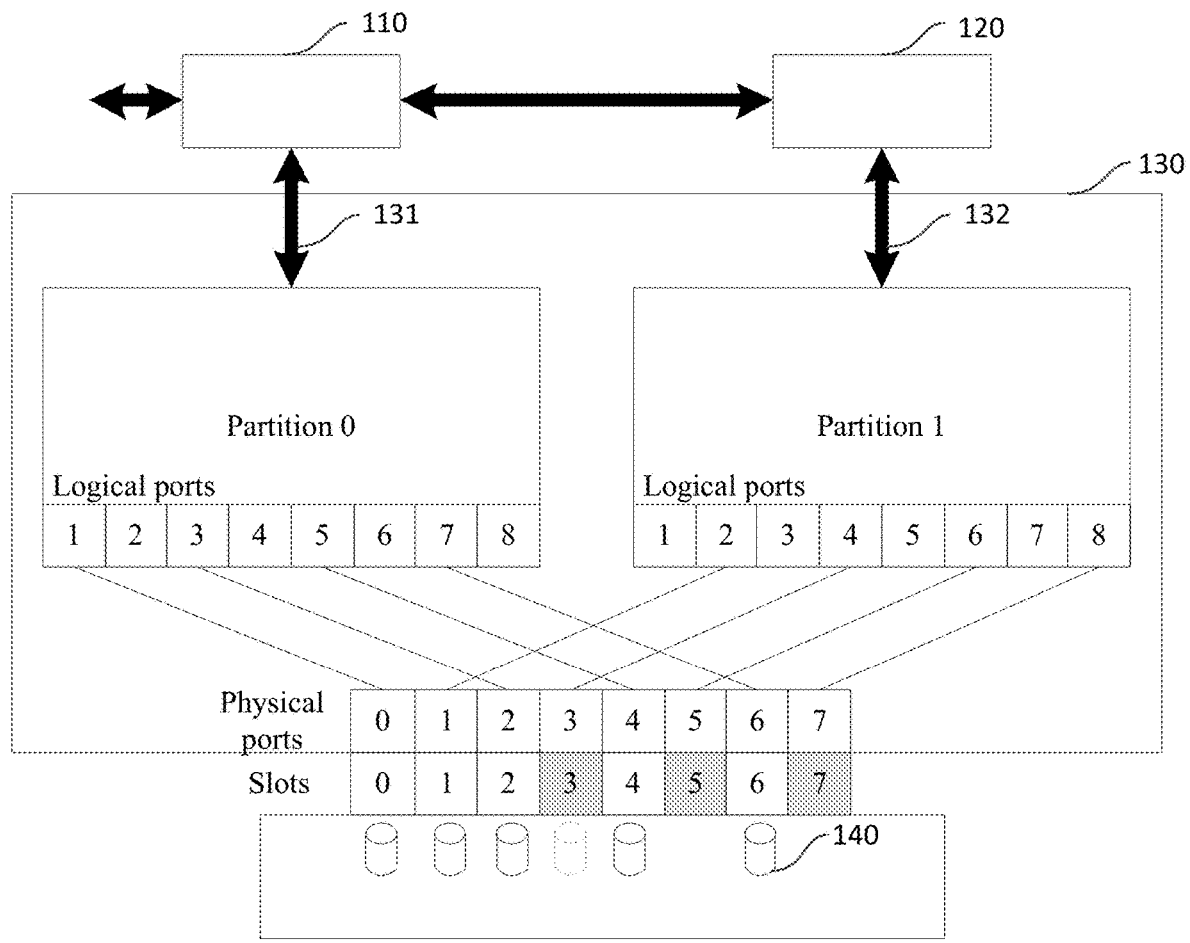
FIG. 6 illustrates a schematic diagram of an example of a storage device failure according to the prior art.

Case 2: the user inserts the storage devices 140 according to the user manual, and creates a storage pool based on the storage devices 140 sequentially inserted, as shown in FIG. 6. Assume that a storage pool is created based on the storage devices 140 corresponding to slots 0, 1, 2, 3, and 4, and the storage device 140 corresponding to slot 6 is outside the storage pool. If the storage device 140 corresponding to slot 3 fails for some reason, the storage pool needs to rebuild a new storage device 140, and the system is likely to use the storage device 140 corresponding to slot 6 in the storage pool. Eventually, the balance will be broken again because the storage devices 140 corresponding to slots 0, 2, 4, and 6 are mapped to partition 0, while only the storage device 140 corresponding to slot 1 is mapped to partition 1, which means that most of the data will transport with the computing device 110 via the bus 131, so that most of the data load will be on the computing device 110, and the computing device 120 and the bus 132 will be relatively idle.

In order to at least partially solve one or more of the above problems and other potential problems, example embodiments of the present disclosure propose a solution for managing computing devices. In this solution, an associated weight of each storage device is determined based on the mapping relationship between each storage device in the plurality of storage devices and the plurality of partitions included in the switch, the plurality of partitions are respectively associated with a plurality of computing devices, the plurality of storage devices are respectively connected to a plurality of downstream physical ports of the switch, a total associated weight of a storage pool is determined based on the associated weight of each storage device in the plurality of storage devices, the storage pool is created based on the plurality of storage devices, and if it is determined that the total associated weight does not satisfy a predetermined balance condition, the mapping relationship between the plurality of partitions and the downstream physical ports is adjusted. As such, it is possible to, by dynamically adjusting the mapping relationship between the plurality of partitions of the switch and the downstream physical ports, dynamically adjust the mapping relationship between the computing device associated with the partition and the storage device connected to the downstream physical port, thereby implementing dynamic balancing of the workload on the plurality of computing devise and buses, and improving the overall performance.

A specific example of the present solution will be described in detail hereunder with reference to figures.

Figure 7:
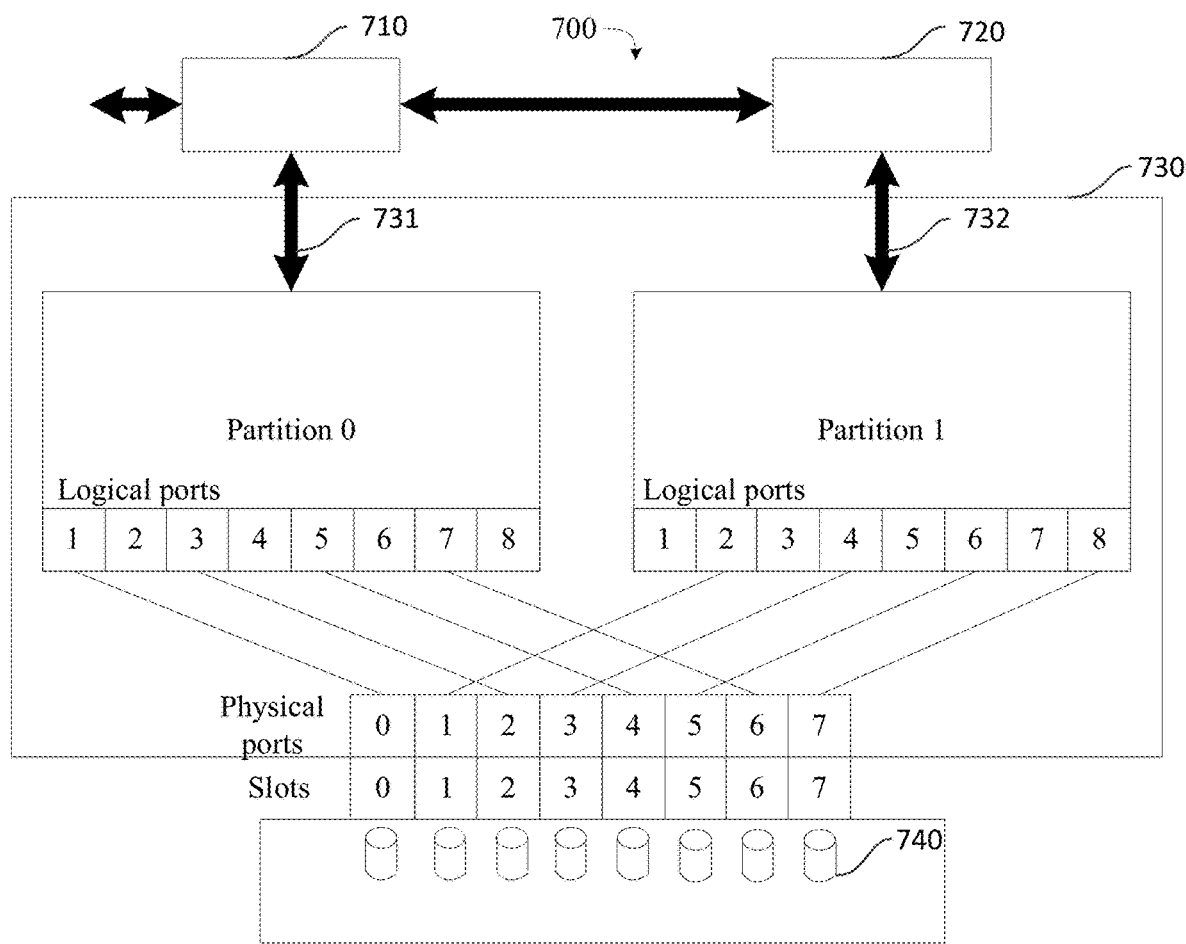
FIG. 7 illustrates a schematic diagram of an example of an information processing environment 100 according to an embodiment of the present disclosure.

FIG. 7 illustrates a schematic diagram of an example of an information processing environment 100 according to an embodiment of the present disclosure. The information processing environment 700 includes computing devices 710-720, a switch 730, and a plurality of storage devices 740.

The computing devices 710-720 are, for example but not limited to, processors, such as Central Processing Units (CPU).

The switch 730 is used to determine an associated weight of each storage device based on a mapping relationship between each storage device 740 in the plurality of storage devices 740 and the plurality of partitions included in the switch 730, and if the switch 730 determines that the total associated weight does not satisfy a predetermined balance condition, the switch board 730 adjusts the mapping relationship between the plurality of partitions and the download physical ports, to enable the adjusted total weight to satisfy the predetermined balance condition. In some embodiments, the switch 730 is connected to the computing devices 710-720 via two upstream ports and two buses 731-732, respectively. The bus is, for example but not limited to, a PCIe bus. The switch 730 is, for example but not limited to, a PCIe switch. The switch 730 may include two partitions. Partition 0 is associated with computing device 710, and partition 1 is associated with computing device 720. The partitions are used to manage the corresponding downstream physical ports. It should be understood that although two computing devices, two partitions, two upstream ports and two buses are described herein, this is only by way of example and more computing devices, partitions, upstream ports and buses may be included, and the scope of the present disclosure is not limited here. The switch 730 is further configured with a routing table regarding storage devices, and the routing table indicates downstream physical ports, logical ports, first partitions, second partitions, and associated weights of each storage device.

The plurality of storage devices 740 are used to build a storage pool. Each storage device in the plurality of storage devices 740 is associated with an associated weight configured by the switch 730. The storage device 740 is, for example but not limited to, a PCIe drive, an NVMe drive, etc. The storage device 740 is connected to the downstream physical port of the switch 730. For example, the storage device 740 may be inserted into a slot, and the slot is connected to the downstream physical port of the switch 730.

As shown in FIG. 7, there may be 8 slots, respectively mapped or connected to 8 physical ports from switch 730, including 4 physical ports 0, 2, 4 and 6 mapped to logical ports 1, 3, 5 and 7 of partition 0, and 4 physical ports 1, 3, 5 and 7 mapped to logical ports 2, 4, 6 and 8 of partition 1. It should be understood that the eight slots, physical ports, and logical ports shown in FIG. 7 are merely examples, and more or fewer slots, physical ports and logical ports may be included. It should also be understood that the above mapping method is only an example, and other mapping manners may also be used, and the scope of the present disclosure is not limited herein.

Figure 8:
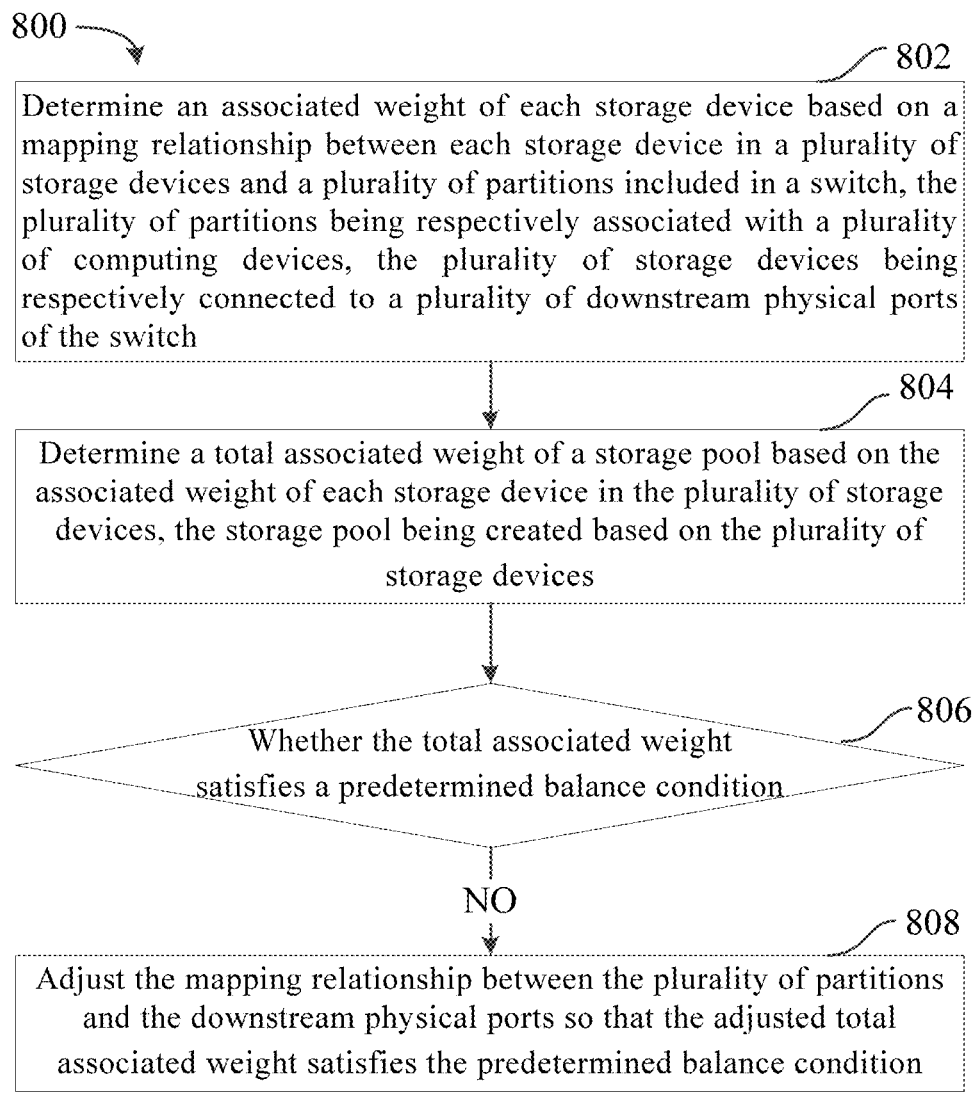
FIG. 8 illustrates a schematic flowchart of a method 800 for managing computing devices according to an embodiment of the present disclosure.

The method for managing computing devices of the present disclosure will be described below with reference to FIG. 7 and FIG. 8. FIG. 8 illustrates a schematic flowchart of a method 800 for managing computing devices according to an embodiment of the present disclosure. For example, the method 800 may be performed by the switch 730 shown in FIG. 7. It should be understood that the method 800 may also include additional blocks not shown and/or the blocks shown may be omitted, and the scope of the present disclosure is not limited in this regard.

At block 802, the switch 730 determines the associated weight of each storage device 740 based on the mapping relationship between each storage device 740 of the plurality of storage devices 740 and the plurality of partitions included in the switch 730, the plurality of partitions are respectively associated with the plurality of computing devices, and the plurality of storage devices are respectively connected to the plurality of downstream physical ports of the switch 730.

In some embodiments, the mapping between the storage device and the partition may include the mapping between the downstream physical port of the switch to which the storage device is connected and the partition. In one example, the mapping between the downstream physical port and the partition may include the mapping between the downstream physical port and the logical port of the partition. For example, as shown in FIG. 7, the mapping between the downstream physical port 0 connected to the storage device 740 corresponding to the slot 0 and the logical port 1 of the partition 0 is shown. The above mapping may be implemented by, for example, a routing table.

In some embodiments, the plurality of partitions may include two partitions. Accordingly, the plurality of computing devices may include two computing devices. In some embodiments, determining the associated weight of each storage device 740 may include determining the associated weight of the storage device 740 as a first value if the storage device 740 is determined to be mapped to the first partition, and determining the associated weight of the storage device 740 as a second value if the storage device 740 is determined to be mapped to the second partition, the second value and the first value are opposite numbers, and the second value is a positive number. For example, the first value may be −1, and the second value may be 1.

The switch may include, for example, a PCIe switch. The storage device may include, for example, a PCIe drive and/or an NVMe drive.

At block 804, the switch 730 determines the total associated weight of the storage pool based on the associated weight of each storage device of the plurality of storage devices 740, and the storage pool is created based on the plurality of storage devices 740.

In some embodiments, determining the total associated weight of the storage pool may include summing the associated weights of plurality of storage devices 740.

At block 806, the switch 730 determines whether the total associated weight satisfies a predetermined balance condition. In some embodiments, the predetermined balance condition may include a predetermined range of values.

If the switch 730 determines at block 806 that the total associated weight does not satisfy the predetermined balance condition, then at block 808, the switch 730 adjusts the mapping relationship between plurality of partitions and downstream physical ports. By adjusting the mapping relationship between the partitions and the downstream physical ports, the mapping relationship between the storage devices connected to the downstream physical ports and the partitions is adjusted, thereby causing the associated weight of the storage device to change so that the adjusted total weight satisfies the predetermined balance condition.

In some embodiments, adjusting the mapping relationship between plurality of partitions and downstream physical ports may include adjusting the downstream physical port mapped to the first partition to be mapped to the second partition if the total associated weight is determined less than a first threshold, so that the adjusted total associated weight is greater than or equal to the first threshold, and adjusting the downstream physical port mapped to the second partition to be mapped to the first partition if the total associated weight is determined greater than a second threshold, so that the adjusted total associated weight is smaller than or equal to the second threshold, wherein the second threshold and first threshold are opposite numbers, and the second threshold is a positive number.

In one example, adjusting the downstream physical port mapped to the first partition to be mapped to the second partition may include adjusting the downstream physical port mapped to a logical port of the first partition to be mapped to the same logical port of the second partition, and adjusting the downstream physical port mapped to the second partition to be mapped to the first partition may include adjusting the downstream physical port mapped to a logical port of the second partition to be mapped to the same logical port of the first partition.

In some embodiments, the first threshold may include the first value, and the second threshold may include the second value. For example, in the case where the first value is −1 and the second value is 1, the first threshold may be −1, and the second threshold may be 1.

Thus, it is possible to, by dynamically adjusting the mapping relationship between the plurality of partitions of the switch and downstream physical ports, dynamically adjust the mapping relationship between the computing devices associated with the partitions and the storage devices connected to the downstream physical ports, thereby enabling dynamic balancing of the workloads on the plurality of computing devices and buses, and improving overall performance. In addition, the user's operations are simplified and the user experience is improved.

In some embodiments, the switch may be connected to two computing devices via two upstream ports, the first partition and the second partition of the switch respectively correspond to the two upstream ports, and the switch may further be configured with a routing table regarding the storage devices, and the routing table may indicate downstream physical ports, logical ports, the first partition, the second partition, and the associated weight of each storage device.

The following will take the two partitions corresponding to two computing devices as an example to illustrate how the above solution solves the problem of the above case 1.

The mapping relationship such as a routing table between each storage device 740 of the plurality of storage devices 740 and the two partitions included in the switch 730 may be maintained. The routing table may indicate serial numbers of the storage devices, and the mapped (also referred to bound) partitions. The routing table may further indicate a slot corresponding to the storage device, a connected physical port, a mapped logical port and a CPU ID. Referring to FIG. 5, Table 1 shows the routing table in an initial state.

TABLE 1

| Drive number | Slot | Physical port | Logical port | Partition | CPU ID | Weight |
|---|---|---|---|---|---|---|
| d0 | 0 | 0 | 1, bound | 0 | 0 | −1 |
|  |  |  | 1 | 1 | 1 | 0 |
| d1 | 1 | 1 | 2 | 0 | 0 | 0 |
|  |  |  | 2, bound | 1 | 1 | 1 |
| d2 | 2 | 2 | 3, bound | 0 | 0 | −1 |
|  |  |  | 3 | 1 | 1 | 0 |
| Empty | 3 | 3 | 4 | 0 | 0 | 0 |
|  |  |  | 4 | 1 | 1 | 0 |
| D4 | 4 | 4 | 5, bound | 0 | 0 | −1 |
|  |  |  | 5 | 1 | 1 | 0 |
| Empty | 5 | 5 | 6 | 0 | 0 | 0 |
|  |  |  | 6, bound | 1 | 1 | 0 |
| D6 | 6 | 6 | 7, bound | 0 | 0 | −1 |
|  |  |  | 7 | 1 | 1 | 0 |
| Empty | 7 | 7 | 8 | 0 | 0 | 0 |
|  |  |  | 8, bound | 1 | 1 | 0 |
| Total weight |  |  |  |  |  | −3 |

If it is determined that the storage device 740 is mapped to partition 0, the associated weight of the storage device 740 is determined as −1, and if it is determined that the storage device 740 is mapped to partition 1, the associated weight of the storage device 740 is determined as 1.

The total associated weight of the storage pool is determined based on the associated weight of each storage device 740 in the plurality of storage devices 740. In this example, the total associated weight is −3.

Determination is made as to whether the total associated weight is greater than or equal to −1 and less than or equal to 1. If the total associated weight is less than −1, the physical port mapped to partition 0 is adjusted to be mapped to partition 1, so that the adjusted total associated weight is greater than or equal to −1, and if the total associated weight is greater than 1, the physical port mapped to the partition 1 is adjusted to be mapped to the partition 0, so that the adjusted total associated weight is less than or equal to 1.

In this example, the total associated weight is −3, which is less than −1, so the physical port 6 mapped to partition 0 is adjusted to be mapped to partition 1. Specifically, the physical port 6 mapped to the logical port 7 of the partition 0 is adjusted to be mapped to the logical port 7 of the partition 1, as shown in Table 2. By adjusting the mapping relationship between the physical port and the logical port and partition, i.e., adjusting the mapping relationship between the storage device connected to the physical port and the logical port and partition, the associated weight of the adjusted storage device D6 is made change from −1 to 1, and the adjusted total associated weight is made become −1, which satisfies the predetermined balance condition.

TABLE 2

| Drive number | Slot | Physical port | Logical port | Partition | CPU ID | Weight |
|---|---|---|---|---|---|---|
| d0 | 0 | 0 | 1, bound | 0 | 0 | −1 |
|    |   |   | 1 | 1 | 1 | 0 |
| d1 | 1 | 1 | 2 | 0 | 0 | 0 |
|    |   |   | 2, bound | 1 | 1 | 1 |
| d2 | 2 | 2 | 3, bound | 0 | 0 | −1 |
|    |   |   | 3 | 1 | 1 | 0 |
| empty | 3 | 3 | 4 | 0 | 0 | 0 |
|    |   |   | 4 | 1 | 1 | 0 |
| D4 | 4 | 4 | 5, bound | 0 | 0 | −1 |
|    |   |   | 5 | 1 | 1 | 0 |
| empty | 5 | 5 | 6 | 0 | 0 | 0 |
|    |   |   | 6, bound | 1 | 1 | 0 |
| D6 | 6 | 6 | 7 | 0 | 0 | 0 |
|    |   |   | 7, bound | 1 | 1 | 1 |
| empty | 7 | 7 | 8 | 0 | 0 | 0 |
|    |   |   | 8, bound | 1 | 1 | 0 |
| Total weight |   |   |   |   |   | −1 |

Figure 9:
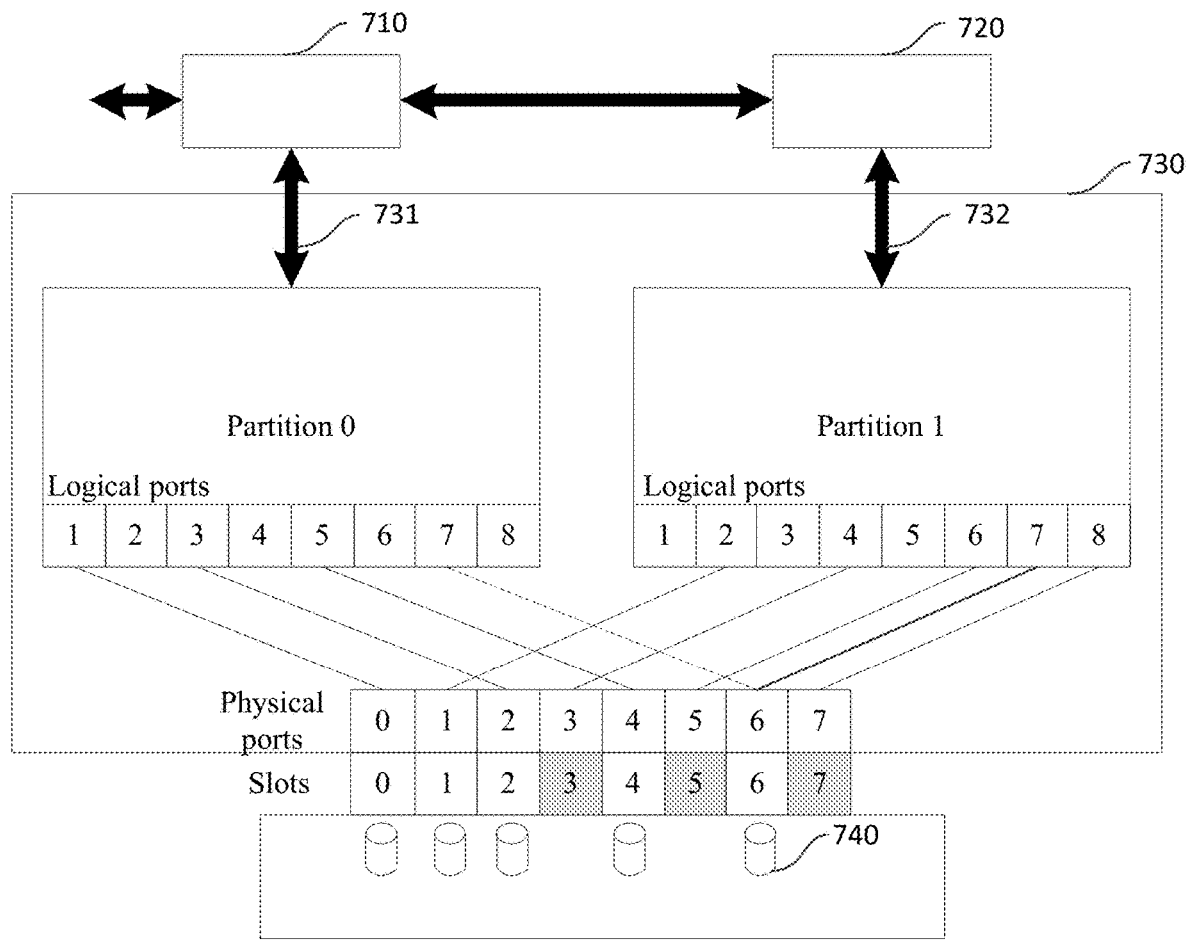
FIG. 9 illustrates a schematic diagram of performing dynamic balancing for a situation where storage devices are randomly arranged according to an embodiment of the present disclosure.

FIG. 9 illustrates a schematic diagram of performing dynamic balancing for a situation where storage devices are randomly arranged according to an embodiment of the present disclosure. As shown in FIG. 9, the storage devices corresponding to slots 0, 2, and 4 are mapped to partition 0 after dynamic balancing, and transfer data with the computing device 710 through the bus 731, whereas the storage devices corresponding to slots 1 and 6 are mapped to partition 0, and transfer data with the computing device 720 through the bus 732. The data loads on the two buses 731-732 and the two computing devices 710-720 are balanced.

Figure 10:
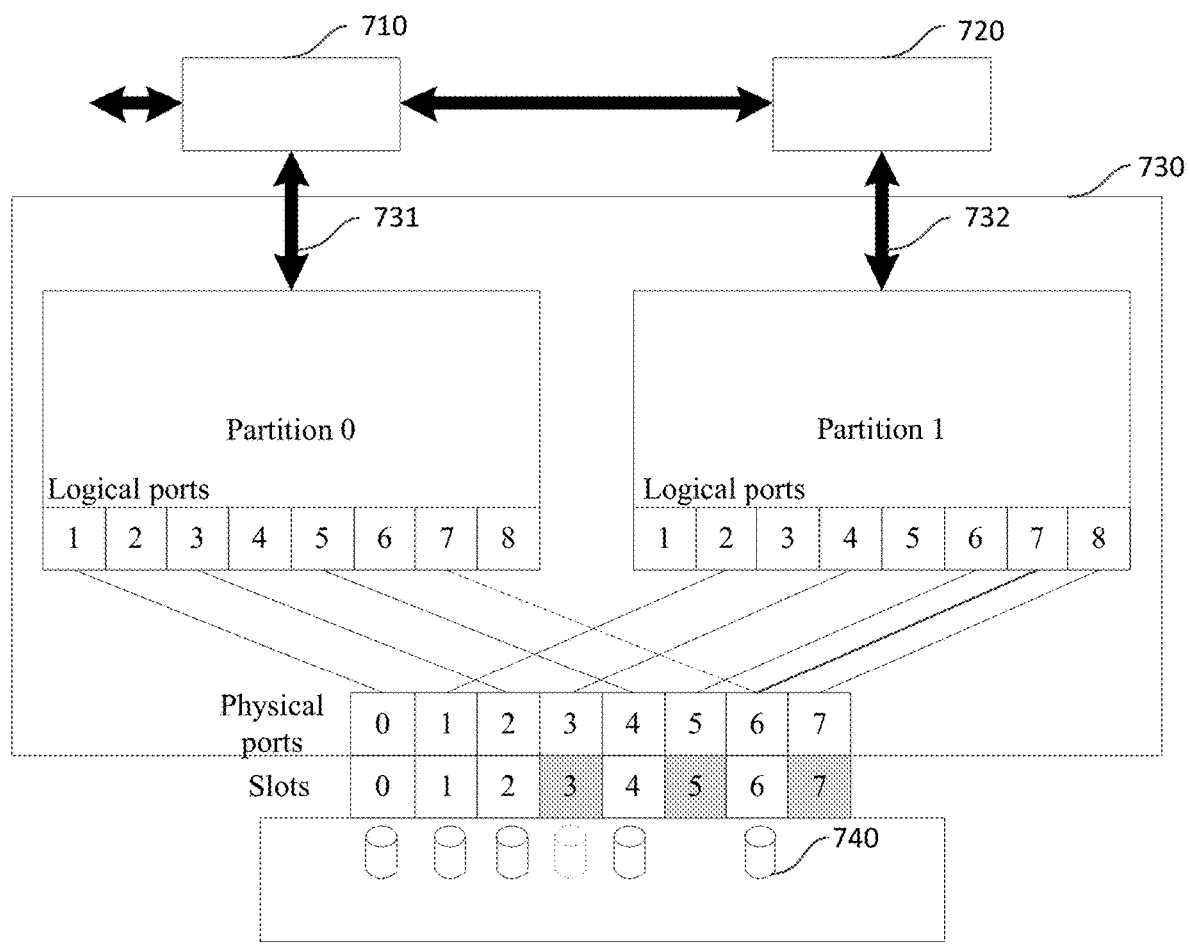
FIG. 10 illustrates a schematic diagram of performing dynamic balancing for a storage device failure according to an embodiment of the present disclosure.

For Case 2, the adjustment process is similar. FIG. 10 illustrates a schematic diagram of performing dynamic balancing for a storage device failure according to an embodiment of the present disclosure. As shown in FIG. 10, after the storage device corresponding to slot 3 fails, its associated weight will be reset to 0, as shown in Table 1, and then the total associated weight of the storage pool is determined to be −3, which is less than −1, as described above. Therefore, the physical port 6 mapped to the partition 0 is adjusted to be mapped to the partition 1. After dynamic balancing, the storage devices corresponding to slots 0, 2, and 4 are mapped to partition 0, and transfers data with the computing device 710 through the bus 731, whereas the storage devices corresponding to slots 1 and 6 are mapped to partition 0, and transfer data with the computing device 720 through the bus 732, the data loads on the two buses 731-732 and the two computing devices 710-720 are also balanced.

Figure 11:
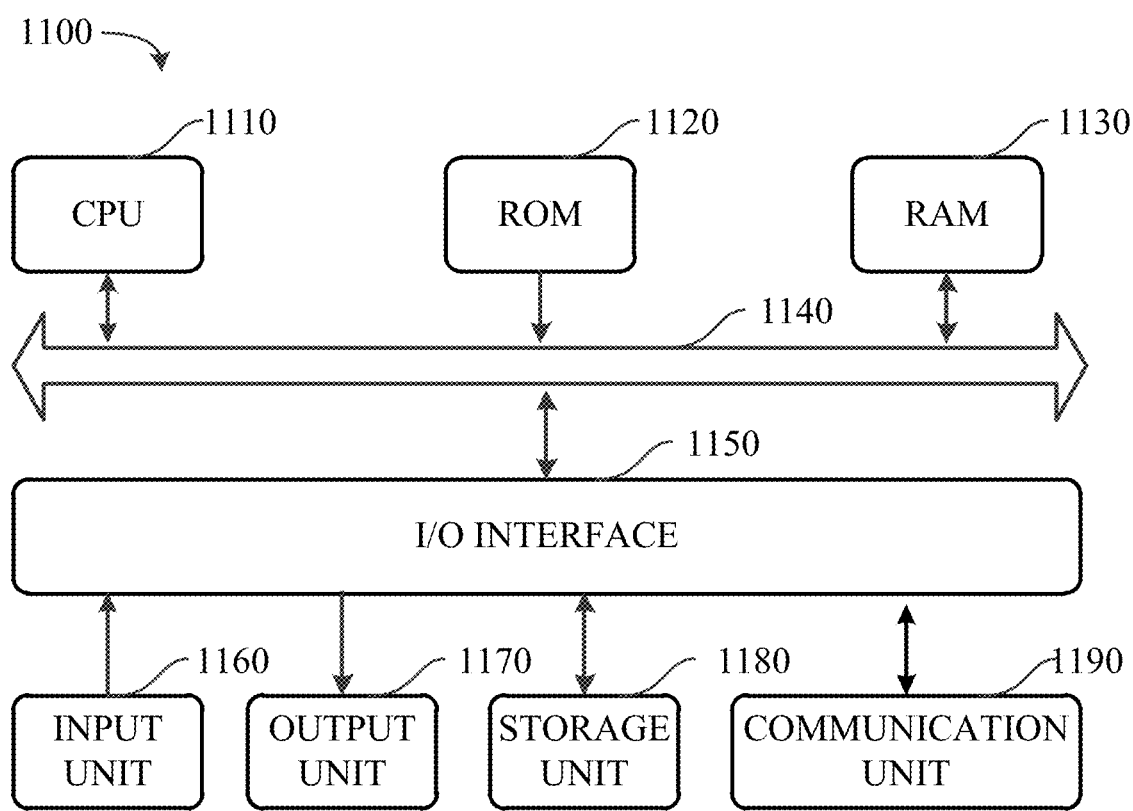
FIG. 11 illustrates a schematic block diagram of an example device 1100 that can be used to implement embodiments of the present disclosure.

FIG. 11 illustrates a block diagram of an example device 1100 adapted to implement embodiments of the present disclosure. For example, the switch 730 shown in FIG. 7 may be implemented by the device 1100. As shown in the figure, the device 1100 includes a central processing unit (CPU) 1110 that may perform various appropriate actions and processing based on computer program instructions stored in a read-only memory (ROM) 1120 or computer program instructions loaded from a storage unit 1180 to a random access memory (RAM) 1130. In the RAM 1130, there further store various programs and data needed for operations of the device 1100. The CPU 1110, ROM 1120 and RAM 1130 are connected to each other via a bus 1140. An input/output (I/O) interface 1150 is also connected to the bus 1140.

Various components in the device 1100 are connected to the I/O interface 1150, including: an input unit 1160 such as a keyboard, a mouse and the like; an output unit 1170 including various kinds of displays and a loudspeaker, etc.; a storage page 1180 including a magnetic disk, an optical disk, and etc.; a communication unit 1190 including a network card, a modem, and a wireless communication transceiver, etc. The communication unit 1190 allows the device 1100 to exchange information/data with other devices through a computer network such as the Internet and/or various kinds of telecommunications networks.

Various processes and processing described above, e.g., the method 800 may be executed by the processing unit 1110. For example, in some embodiments, the method 800 may be implemented as a computer software program that is tangibly included in a machine readable medium, e.g., the storage unit 1180. In some embodiments, part or all of the computer program may be loaded and/or mounted onto the device 1100 via ROM 1120 and/or communication unit 1190. When the computer program is loaded to the RAM 1130 and executed by the CPU 1110, one or more steps of the method 800 as described above may be executed.

The present disclosure may be a method device, system and/or computer program product. The computer program product may include a computer readable storage medium on which computer readable program instructions for executing various aspects of the present disclosure are embodied.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processing unit of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for managing computing devices, comprising:
    determining an associated weight of each storage device based on a mapping relationship between each storage device in a plurality of storage devices and a plurality of partitions included in a switch, storage devices mapped to a first partition of the plurality of partitions having weights that are a negative of weights of storage devices mapped to a second partition of the plurality of partitions, the plurality of partitions being respectively associated with a plurality of computing devices, the plurality of storage devices being respectively connected to a plurality of downstream physical ports of the switch;
    determining a total associated weight of a storage pool based on a sum of the associated weight of each storage device in the plurality of storage devices, the storage pool being created based on the plurality of storage devices; and
    if it is determined that the total associated weight does not satisfy a predetermined balance condition, adjusting the mapping relationship between the plurality of partitions and the downstream physical ports.

2. The method according to claim 1, wherein the plurality of partitions comprise two partitions.

3. The method according to claim 2, wherein determining the associated weight of each storage device comprises:

determining the associated weight of each storage device as a first value in response to determining that the storage device is mapped to the first partition; and determining the associated weight of the storage device as a second value in response to determining that the storage device is mapped to the second partition, the second value and the first value being opposite numbers, and the second value being a positive number.

4. The method according to claim 3, wherein adjusting the mapping relationship between the plurality of partitions and the downstream physical ports comprises:

adjusting the downstream physical port mapped to the first partition to be mapped to the second partition in response to determining that the total associated weight is less than a first threshold, so that the adjusted total associated weight is greater than or equal to the first threshold; and adjusting the downstream physical port mapped to the second partition to be mapped to the first partition in response to determining that the total associated weight is greater than a second threshold, so that the adjusted total associated weight is smaller than or equal to the second threshold, wherein the second threshold and first threshold are opposite numbers, and the second threshold is a positive number.

5. The method according to claim 4, wherein adjusting the downstream physical port mapped to the first partition to be mapped to the second partition comprises:

adjusting the downstream physical port mapped to a logical port of the first partition to be mapped to the same logical port of the second partition.

6. The method according to claim 5, wherein adjusting the downstream physical port mapped to the second partition to be mapped to the first partition comprises:

adjusting the downstream physical port mapped to the logical port of the second partition to be mapped to the same logical port of the first partition.

7. The method according to claim 6, wherein the switch is connected to two computing devices via two upstream ports, the first partition and the second partition of the switch respectively corresponding to the two upstream ports, the switch being configured with a routing table regarding the storage devices, and the routing table indicating downstream physical ports, the logical ports, the first partition, the second partition, and the associated weight of each storage device.

8. The method according to claim 4, wherein the first threshold comprises the first value, and the second threshold comprises the second value.

9. The method according to claim 1, wherein the switch comprises a PCIe switch, and the storage device comprises at least one of a PCIe drive and an NVMe drive.

10. An electronic device, comprising:
at least one processing unit; and
at least one memory coupled to the at least one processing unit and having instructions stored thereon and executed by the at least one processing unit, the instructions, when executed by the at least one processing unit, causing the device to perform the steps of:

determining an associated weight of each storage device based on a mapping relationship between each storage device in a plurality of storage devices and a plurality of partitions included in a switch, storage devices mapped to a first partition of the plurality of partitions having weights that are a negative of weights of storage devices mapped to a second partition of the plurality of partitions, the plurality of partitions being respectively associated with a plurality of computing devices, the plurality of storage devices being respectively connected to a plurality of downstream physical ports of the switch;

determining a total associated weight of a storage pool based on a sum of the associated weight of each storage device in the plurality of storage devices, the storage pool being created based on the plurality of storage devices; and if it is determined that the total associated weight does not satisfy a predetermined balance condition, adjusting the mapping relationship between the plurality of partitions and the downstream physical ports.

11. The electronic device according to claim 10, wherein the plurality of partitions comprise two partitions.

12. The electronic device according to claim 11, wherein determining the associated weight of each storage device comprises:

determining the associated weight of each storage device as a first value in response to determining that the storage device is mapped to the first partition; and determining the associated weight of the storage device as a second value in response to determining that the storage device is mapped to the second partition, the second value and the first value being opposite numbers, and the second value being a positive number.

13. The electronic device according to claim 12, wherein adjusting the mapping relationship between the plurality of partitions and the downstream physical ports comprises:

adjusting the downstream physical port mapped to the first partition to be mapped to the second partition in response to determining that the total associated weight is less than a first threshold, so that the adjusted total associated weight is greater than or equal to the first threshold; and adjusting the downstream physical port mapped to the second partition to be mapped to the first partition in response to determining that the total associated weight is greater than a second threshold, so that the adjusted total associated weight is smaller than or equal to the second threshold, wherein the second threshold and first threshold are opposite numbers, and the second threshold is a positive number.

14. The electronic device according to claim 13, wherein adjusting the downstream physical port mapped to the first partition to be mapped to the second partition comprises: adjusting the downstream physical port mapped to a logical port of the first partition to be mapped to the same logical port of the second partition.

15. The electronic device according to claim 14, wherein adjusting the downstream physical port mapped to the second partition to be mapped to the first partition comprises: adjusting the downstream physical port mapped to the logical port of the second partition to be mapped to the same logical port of the first partition.

16. The electronic device according to claim 15, wherein the switch is connected to two computing devices via two upstream ports, the first partition and the second partition of the switch respectively corresponding to the two upstream ports, the switch being configured with a routing table regarding the storage devices, and the routing table indicating downstream physical ports, the logical ports, the first partition, the second partition, and the associated weight of each storage device.

17. The electronic device according to claim 13, wherein the first threshold comprises the first value, and the second threshold comprises the second value.

18. The electronic device according to claim 10, wherein the switch comprises a PCIe switch, and the storage device comprises at least one of a PCIe drive and an NVMe drive.

19. A computer program product having a non-transitory computer readable medium which stores a set of instructions to manage computing devices; the set of instructions, when carried out by computerized circuitry, causing the computerized circuitry to perform a method of:
- determining an associated weight of each storage device based on a mapping relationship between each storage device in a plurality of storage devices and a plurality of partitions included in a switch, storage devices mapped to a first partition of the plurality of partitions having weights that are a negative of weights of storage devices mapped to a second partition of the plurality of partitions, the plurality of partitions being respectively associated with a plurality of computing devices, the plurality of storage devices being respectively connected to a plurality of downstream physical ports of the switch;
- determining a total associated weight of a storage pool based on a sum of the associated weight of each storage device in the plurality of storage devices, the storage pool being created based on the plurality of storage devices; and
- if it is determined that the total associated weight does not satisfy a predetermined balance condition, adjusting the mapping relationship between the plurality of partitions and the downstream physical ports.

\* \* \* \* \*